(12) United States Patent
Yoon et al.

(10) Patent No.: US 9,534,821 B2
(45) Date of Patent: Jan. 3, 2017

(54) REFRIGERATOR AND CONTROL METHOD THEREOF

(75) Inventors: Sinn Bong Yoon, Gwangju-si (KR); Eui Young Chang, Anyang-si (KR); Jong Chul Choi, Gwangju (KR); Yong Han Kim, Cheonan-si (KR); Won Je Lee, Gwangju (KR); Jong Eon Si, Gwangju (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1092 days.

(21) Appl. No.: 13/559,916

(22) Filed: Jul. 27, 2012

(65) Prior Publication Data

US 2013/0025303 A1 Jan. 31, 2013

(30) Foreign Application Priority Data

Jul. 29, 2011 (KR) ........................ 10-2011-0075697

(51) Int. Cl.
| | |
|---|---|
| *F25D 17/00* | (2006.01) |
| *F25D 17/04* | (2006.01) |
| *G05D 23/32* | (2006.01) |
| *F25B 49/02* | (2006.01) |
| *F25D 29/00* | (2006.01) |
| *F25C 5/08* | (2006.01) |
| *F25D 21/00* | (2006.01) |

(52) U.S. Cl.
CPC ............. *F25B 49/022* (2013.01); *F25C 5/08* (2013.01); *F25D 29/00* (2013.01); *F25C 2600/02* (2013.01); *F25D 21/006* (2013.01); *F25D 2700/12* (2013.01); *F25D 2700/122* (2013.01); *Y02P 60/855* (2015.11)

(58) Field of Classification Search
CPC .. F25D 21/08; Y02B 70/3266; Y02B 70/3225; Y02B 70/3233; Y02B 30/765; Y04S 20/242; Y04S 20/225
See application file for complete search history.

(56) References Cited

U.S. PATENT DOCUMENTS

| | | | | |
|---|---|---|---|---|
| 4,197,717 | A | * 4/1980 | Schumacher | ........ G05D 23/275 62/213 |
| 2004/0254654 | A1* | 12/2004 | Donnelly et al. | ............... 700/22 |
| 2007/0186570 | A1* | 8/2007 | Kopf | ....................... F25C 5/187 62/135 |

(Continued)

*Primary Examiner* — M. Alexandra Elve
*Assistant Examiner* — Henry Crenshaw
(74) *Attorney, Agent, or Firm* — Staas & Halsey LLP

(57) ABSTRACT

A control method of a refrigerator including a compressor to supply refrigerant to an evaporator to cool a storage compartment, a valve to adjust flow of the refrigerant, a fan to blow air heat-exchanged by the evaporator, and a heater to remove frost from the evaporator. The control method includes, upon receiving a power-saving signal, determining whether the received power-saving signal is a first or second power-saving mode signal, upon determining that the power-saving signal is the first power-saving mode signal, performing at least one selected from among resetting of target temperature of the storage compartment, adjustment of an operation rate of the compressor, and adjustment of operation time of the heater to execute a first power-saving mode, and, upon determining that the power-saving signal is the second power-saving mode signal, controlling the compressor, the fan, and the heater to be off to execute a second power-saving mode.

11 Claims, 7 Drawing Sheets

(56) References Cited

U.S. PATENT DOCUMENTS

| | | | |
|---|---|---|---|
| 2008/0156000 A1* | 7/2008 | Shin et al. | 62/73 |
| 2010/0070091 A1* | 3/2010 | Watson | G06Q 50/06 700/278 |
| 2010/0083688 A1* | 4/2010 | Hausmann et al. | 62/441 |
| 2010/0092625 A1* | 4/2010 | Finch et al. | 426/231 |
| 2010/0101254 A1* | 4/2010 | Besore | G06Q 50/06 62/264 |
| 2011/0000248 A1* | 1/2011 | Jeong et al. | 62/344 |
| 2011/0098869 A1* | 4/2011 | Seo | G01D 4/004 700/296 |
| 2012/0047920 A1* | 3/2012 | Hanley et al. | 62/80 |
| 2012/0055179 A1* | 3/2012 | Junge et al. | 62/80 |

* cited by examiner

REFRIGERATOR AND CONTROL METHOD THEREOF

CROSS-REFERENCE TO RELATED APPLICATIONS

This application claims the benefit of Korean Patent Application No. 2011-075697, filed on Jul. 29, 2011 in the Korean Intellectual Property Office, the disclosure of which is incorporated herein by reference.

BACKGROUND

1. Field

Embodiments of the present disclosure relate to a refrigerator that controls driving of a load to reduce power consumption and/or electric charges and a control method thereof.

2. Description of the Related Art

A refrigerator is an appliance that keeps food and drinks fresh for a long period of time. The refrigerator stores food and drinks in a frozen state or in a refrigerated state depending upon kinds of the food and drinks.

The refrigerator repeatedly performs a refrigeration cycle including compression, condensation, expansion, and evaporation through a compressor, condenser, expansion valve, and evaporator mounted in the refrigerator, and maintains the temperature of a storage compartment at freezing temperature or refrigerating temperature using cool air heat-exchanged by the evaporation of the refrigeration cycle.

The refrigerator has been diversified with improvement of a standard of living, and the capacity of the refrigerator has been increased to store an increased number of goods. Also, the refrigerator has various functions to improve user convenience.

Although the refrigerator provides user convenience, the refrigerator consumes a large amount of power due to increased capacity and various functions thereof, which makes the cost burden too heavy for users in connection with the increase of electric charges.

As power consumption of other electric instruments increases in addition to the refrigerator, it may be necessary to develop energy sources and generate energy. To this end, additional construction of power plants has been proposed. However, such additional construction of power plants may not be desirable in view of construction costs, maintenance costs, and environmental problems. For this reason, technologies to restrict power consumption have been developed.

That is, a next-generation power network in which IT technology is connected to the existing power network so that a utility company and a consumer exchange information in real time in two ways to optimize energy efficiency, i.e. a smart grid concept, has been introduced.

The refrigerator, to which the smart grid concept is introduced, receives information regarding power price from the utility company in real time, and controls a specific function to be on or off based on the received information regarding power price, thereby reducing power consumption.

In the case of a refrigerator, if the refrigerator controls the specific function to be on or off based on the power price, the refrigerator may not efficiently perform a function desired by a user or may not perform a function related to performance improvement with the result that the performance of the refrigerator may be lowered.

SUMMARY

Therefore, it is an aspect of the present disclosure to provide a refrigerator that controls an operation rate or operation time of at least one load at a time zone at which power consumption is concentrated, thereby preventing concentration of power consumption, and a control method thereof.

It is another aspect of the present disclosure to provide a refrigerator that raises target temperature of a storage compartment at a time zone at which power consumption is concentrated, thereby reducing power consumption, and a control method thereof.

It is a further aspect of the present disclosure to provide a refrigerator that controls a plurality of loads to be off for predetermined time at a time zone at which power consumption is concentrated and a control method thereof.

Additional aspects of the disclosure will be set forth in part in the description which follows and, in part, will be apparent from the description, or may be learned by practice of he disclosure.

In accordance with one aspect of the present disclosure, a refrigerator includes an evaporator to cool a storage compartment, a compressor to supply a refrigerant to the evaporator, a valve to adjust flow of the refrigerant supplied from the compressor to the evaporator, a fan to blow air heat-exchanged by the evaporator, a heater to remove frost from the evaporator, and a control device to perform communication with a server of utility company and to control an operation of at least one selected from among the compressor, the valve, the fan, and the heater so that a power-saving mode is executed upon receiving a power-saving signal from the server.

The power-saving signal may include a first power-saving mode and a second power-saving mode set based on a concentration degree of power consumption.

When the power-saving signal is the first power-saving mode, the control device may control an operation of at least one selected from among the compressor, the valve, the fan, and the heater for first execution time.

When the power-saving signal is the first power-saving mode, the control device may raise target temperature of the storage compartment by a predetermined temperature and reset the target temperature, and may control the operation of the compressor, the valve, and the fan so that the temperature of the storage compartment is maintained at the reset target temperature.

When the power-saving signal is the second power-saving mode, the control device may control the compressor, the valve, the fan, and the heater to be off for second execution time.

The first power-saving mode may include a first power-saving level, second power-saving level, and third power-saving level divided based on a reduction amount of power.

When the power-saving signal is the third power-saving level of the first power-saving mode, the control device may determine whether it is defrosting operation time and, upon determining that it is the defrosting operation time, may control the heater to be off for first execution time.

The refrigerator may further include an ice-making compartment, a tray provided in the ice-making compartment to make ice, a water supply valve to adjust supply of water to the tray, an ice-making evaporator to cool the tray, an ice-making valve to adjust flow of a refrigerant supplied to the ice-making evaporator, and an ice-separating heater to separate the ice from the tray, wherein, when the power-saving signal is the second power-saving level of the first power-saving mode, the control device may determine whether it is ice-making operation time and, upon determining that it is the ice-making operation time, may lower an operation rate of the compressor.

When the power-saving signal is the third power-saving level of the first power-saving mode, the control device may determine whether it is ice-making operation time and, upon determining that it is the ice-making operation time, may control the water supply valve, the ice-separating heater, and the ice-making valve to be off for first execution time to delay an ice-making operation.

When the power-saving signal is the third power-saving level of the first power-saving mode, the control device may determine whether an ice-making operation is being performed and, upon determining that the ice-making operation is being performed, may complete the ice-making operation and ice separation, and upon determining that it is a next ice-making operation time, may control the water supply valve, the ice-separating heater, and the ice-making valve to be off until first execution time elapses to delay the next ice-making operation.

The storage compartment may include a freezer compartment to perform freezing.

The refrigerator may further include a refrigerator compartment to store food in a refrigerated state, a refrigerating evaporator to cool the refrigerator compartment, and a defrosting heater of the refrigerating evaporator to remove frost from the refrigerating evaporator, wherein, upon receiving the power-saving signal from the server of utility company, the control device may determine whether it is defrosting operation time of the refrigerating evaporator and, upon determining that it is the defrosting operation time of the refrigerating evaporator, may control an operation of the defrosting heater of the refrigerating evaporator to execute the power-saving mode.

In accordance with another aspect of the present disclosure, a control method of a refrigerator including a compressor to supply a refrigerant to an evaporator to cool a storage compartment, a valve to adjust flow of the refrigerant supplied from the compressor to the evaporator, a fan to blow air heat-exchanged by the evaporator, and a heater to remove frost from the evaporator includes, upon receiving a power-saving signal from the utility company, determining whether the received power-saving signal is a first power-saving mode signal or a second power-saving mode signal, upon determining that the power-saving signal is the first power-saving mode signal, performing at least one selected from among resetting of target temperature of the storage compartment, adjustment of an operation rate of the compressor, and adjustment of operation time of the heater to execute a first power-saving mode, and, upon determining that the power-saving signal is the second power-saving mode signal, controlling the compressor, the fan, and the heater to be off to execute a second power-saving mode.

The receiving the power-saving signal from the utility company may include receiving execution time of the power-saving mode upon receiving the power-saving signal.

The executing the first power-saving mode may include determining a power-saving level of the first power-saving mode and, when the determined power-saving level is a first power-saving level, controlling the compressor, the fan, and the valve for first execution time so that the temperature of the storage compartment is maintained at the reset target temperature.

The resetting the target temperature may include raising the target temperature of the storage compartment by a predetermined temperature.

The executing the first power-saving mode may include determining a power-saving level of the first power-saving mode, when the determined power-saving level is a second power-saving level, controlling the compressor, the fan, and the valve so that the temperature of the storage compartment is maintained at the reset temperature, determining whether it is ice-making operation time of an ice-making unit provided in the storage compartment, and, upon determining that it is the ice-making operation time, lowering an operation rate of the compressor.

The executing the first power-saving mode may include determining a power-saving level of the first power-saving mode, when the determined power-saving level is a third power-saving level, controlling the compressor, the fan, and the valve so that the temperature of the storage compartment is maintained at the reset temperature, determining whether it is ice-making operation time of an ice-making unit provided in the storage compartment, and, upon determining that it is the ice-making operation time, controlling an ice-making operation to be delayed.

The executing the first power-saving mode may include determining a power-saving level of the first power-saving mode, when the determined power-saving level is a third power-saving level, controlling the compressor, the fan, and the valve so that the temperature of the storage compartment is maintained at the reset target temperature, determining whether an ice-making unit provided in the storage compartment is performing an ice-making operation, upon determining that the ice-making unit is performing the ice-making operation, completing the ice-making operation and performing ice separation, and controlling a next ice-making operation to be delayed.

The control method may further include, upon completing the ice-making operation and the ice separation, performing a full-ice operation to supply cool air to an ice-making compartment.

The executing the first power-saving mode may include determining a power-saving level of the first power-saving mode, when the determined power-saving level is a third power-saving level, controlling the compressor, the fan, and the valve so that the temperature of the storage compartment is maintained at the reset target temperature, and determining whether it is defrosting operation time and, upon determining that it is the defrosting operation time, controlling a defrosting operation to be delayed.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
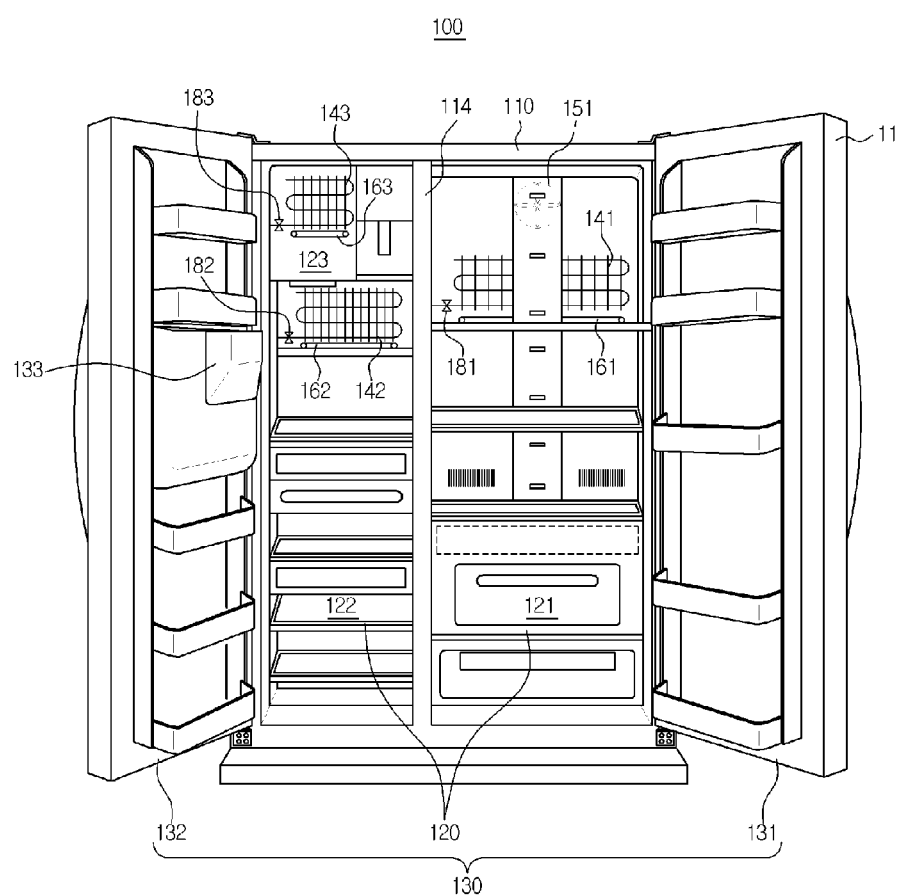
FIG. 1 is a perspective view of a refrigerator according to an embodiment of the present disclosure.

Reference will now be made in detail to the embodiments of the present disclosure, examples of which are illustrated in the accompanying drawings, wherein like reference numerals refer to like elements throughout.

Figure 2:
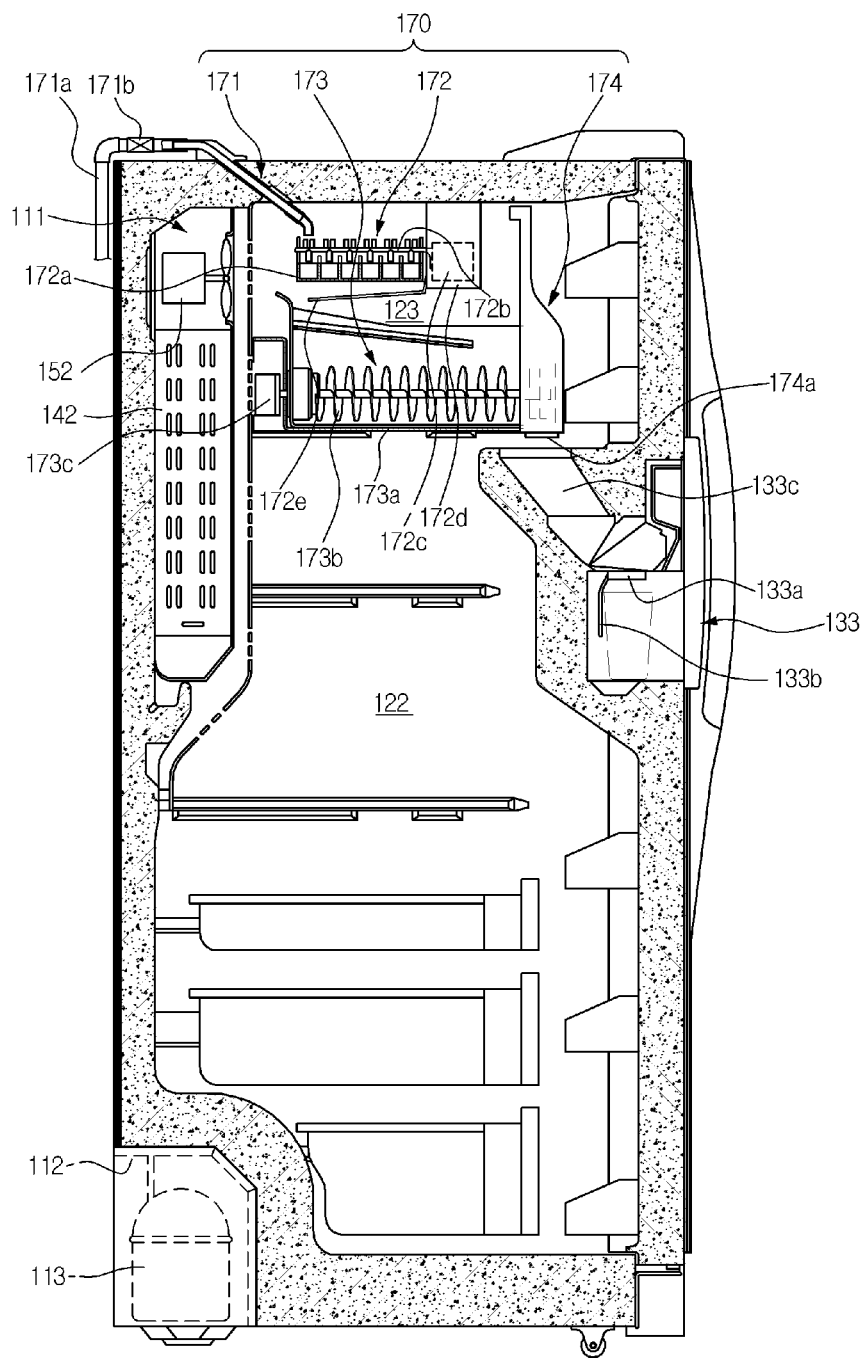
FIG. 2 is a view illustrating the interior of the refrigerator according to the embodiment of the present disclosure.

FIG. 1 is a perspective view of a refrigerator according to an embodiment of the present disclosure, and FIG. 2 is a view illustrating the interior of the refrigerator according to the embodiment of the present disclosure.

As shown in FIG. 1, a refrigerator 100 includes a main body 110, storage compartments 120 (121 and 122), and doors 130 (131 and 132).

The main body 110 forms the external appearance of the refrigerator 100. A duct 111, along which air flows, and a machinery compartment 112 are formed in an inner space of the main body 110.

In the machinery compartment 112 are mounted a compressor 113 to compress a refrigerant so that the refrigerant is discharged in a high-temperature and high-pressure state, a condenser (not shown) to condense the high-temperature and high-pressure refrigerant, compressed by the compressor 113, through the radiation of heat, and a condensing fan to cool the condenser.

The refrigerator has a receiving space defined by the main body 110.

A middle partition 114 is provided in the receiving space. That is, the receiving space of the main body 110 is partitioned into left and right receiving spaces by the middle partition 114 of the main body 110.

The left and right receiving spaces of the main body 110 form the storage compartments 120 (121 and 122) to store food. The storage compartments 120 include a refrigerator compartment 121 to store food in a refrigerated state and a freezer compartment 122 to store food in a frozen state. An ice-making compartment 123 to produce ice is provided in the freezer compartment 122.

In the storage compartments 121 and 122 are mounted shelves and storage boxes to store food.

A plurality of holes h is formed at the wall of the main body 110 defining the storage compartments 120 (121 and 122). That is, air flows between the duct 111 and the storage compartments 120 through the holes. Also, cool air flows between the ice-making compartment and the freezer compartment.

The refrigerator compartment 121 and the freezer compartment 122 are open at the fronts thereof. The doors 130 (131 and 132) are mounted at the open fronts of the refrigerator compartment 121 and the freezer compartment 122, respectively. The doors 130 (131 and 132) shied the refrigerator compartment 121 and the freezer compartment 122 from the outside.

At the insides of the doors 131 and 132 are mounted pluralities of door shelves to store food. At the door 132 of the freezer compartment is provided a dispenser 133 to allow a user to withdraw an object, such as water or ice, without opening the door.

The dispenser 133 is provided at the front of the door 122 so as to form an inwardly depressed space. The dispenser 133 includes a withdrawal port to withdraw an object, an opening and closing member 133a to open and close the withdrawal port, an operating lever 133b to drive the opening and closing member 133a, and an ice discharge channel 133c to achieve communication between the ice-making compartment 123 and the door 122 so that ice is guided to the withdrawal port.

The refrigerator 100 further includes first and second evaporators 141 and 142, first and second fans 151 and 152, and first and second heaters 161 and 162, which are mounted in the duct 111 of the main body 110. Also, the refrigerator 100 further includes a third evaporator 143 and a third heater 163 provided in the ice-making compartment 123.

The first and second evaporators 141 and 142 are mounted so as to correspond to the refrigerator compartment 121 and the freezer compartment 122, respectively, to ambient air and air in the storage compartments 120 (121 and 122) through a cooling action to absorb surrounding latent heat while evaporating a refrigerant supplied from the condenser (not shown). That is, the evaporators 141 and 142 serve to lower temperature of the storage compartments 120 (121 and 122).

The third evaporator 143 is provided in the ice-making compartment 123 to supply cool air to an ice maker.

The first and second fans 151 and 152 are mounted so as to correspond to the refrigerator compartment 121 and the freezer compartment 122, respectively, to suction air from the refrigerator compartment 121 and the freezer compartment 122 and to supply air having passed through the evaporators 141 and 142 to the refrigerator compartment 121 and the freezer compartment 122, respectively. The first and second heaters 161 and 162 are mounted so as to correspond to the evaporators 141 and 142, respectively, to remove frost formed at the evaporators 141 and 142.

The third heater 163 is an ice-separating heater mounted adjacent to the third evaporator 143 in the ice-making compartment 123 to assist ice to be separated from an ice-making unit. In addition, the third heater 163 removes frost formed at the third evaporator 143.

The refrigerator further includes an ice supplier 170 disposed in the ice-making compartment 123 to make and store ice and discharge the ice from the refrigerator through the dispenser 133 as needed.

The ice supplier 170 includes a water supply unit 171 to supply water, an ice-making unit 172 to make ice using the supplied water, a storage unit 173 to store the ice, and a discharge unit 174 to discharge the ice.

The water supply unit 171 includes a water supply pipe 171a to supply water from the outside and a water supply valve 171b to interrupt the flow of water in the water supply pipe 171a.

The ice-making unit 172 includes a tray 172a to receive water supplied to the water supply unit 171, heat from the third evaporator being transmitted to the tray 172a when making ice, heat from the third heater being transmitted to the tray 172a when separating ice, an ejector 172b to separate ice from the tray 172a, a first motor 172c, which is an ice-separating motor to rotate the tray 172a, a fixing member 172d, to which the first motor 172c is mounted, to rotatably fix the gray 172a, and a full-ice lever 172e disposed at the fixing member 172d to detect the amount of ice in a container.

The storage unit 173 includes a container 173a to store ice separated from the tray 172a, a spiral feeding member 173b to move the ice in the container 173a, and a second motor 173c, which is a feeding motor to rotate the feeding member 172b.

The container 173a may be configured in the form of a drawer which can be inserted into and withdrawn from the freezer compartment 122.

When the container 173a is separated from the freezer compartment 122, the feeding member 173b is separated from a shaft of the second motor 173c. When the container 173a is mounted in the freezer compartment 122, the feeding member 173b is coupled to the shaft of the second motor 173c.

The discharge unit 174 is connected to the storage unit 173 and the dispenser 133 to discharge the ice in the storage unit 173 to the front of the door 122 through the dispenser 133. The discharge unit 174 includes a discharge port 174a, through which ice is discharged from the container 173a.

First, second, and third valves 181, 182, and 183 are disposed between the condenser and the evaporators 141, 142, and 143, respectively. The first and second valves 181 and 182 are opened or closed according to temperature of the respective storage compartments 121 and 122, and the third valve 183 is opened or closed according to an ice-making signal.

More specifically, when refrigerating temperature of the refrigerator compartment 121 is higher than first target temperature, the first valve 181 is opened to supply a refrigerant to the evaporator 141. When the refrigerating temperature of the refrigerator compartment 121 reaches the first target temperature, the first valve 181 is closed to interrupt the supply of the refrigerant to the evaporator 141. Also, when freezing temperature of the freezer compartment 122 is higher than second target temperature, the second valve 182 is opened to supply the refrigerant to the evaporator 142. When the freezing temperature of the freezer compartment 122 reaches the second target temperature, the second valve 182 is closed to interrupt the supply of the refrigerant to the evaporator 142.

That is, the refrigerant is supplied to the evaporators 141 and 142 as the first and second valves 181 and 182 are opened. At this time, low-temperature cool air generated through heat exchange of the evaporators 141 and 142 is supplied to the storage compartments 120 (121 and 122). As a result, the temperature of the storage compartments 120 (121 and 122) is lowered.

When the third valve 183, which is an ice-making valve, is opened, the refrigerant is supplied to the third evaporator 143, and the temperature of the ice-making unit 172 is lowered by an evaporation phenomenon of the third evaporator 143 with the result that water in the tray is changed into ice.

Unlike this embodiment, the refrigerator may include an evaporator and a defrosting heater. In this case, the refrigerator compartment and the freezer compartment may be cooled using the evaporator, and frost formed at the evaporator may be removed using the defrosting heater.

Also, cool air, heat-exchanged by the evaporator, may be supplied to the ice-making compartment to make ice. At this time, the cool air supplied from the duct of the main body 110 to the ice-making compartment may be controlled by a damper (not shown) provided at the wall of the main body.

Also, unlike this embodiment, the refrigerator may include an evaporator for the freezer compartment and an evaporator for the refrigerator compartment. In this case, cool air, heat-exchanged by the evaporator for the freezer compartment, may be supplied to the ice-making compartment to make ice.

Figure 3:
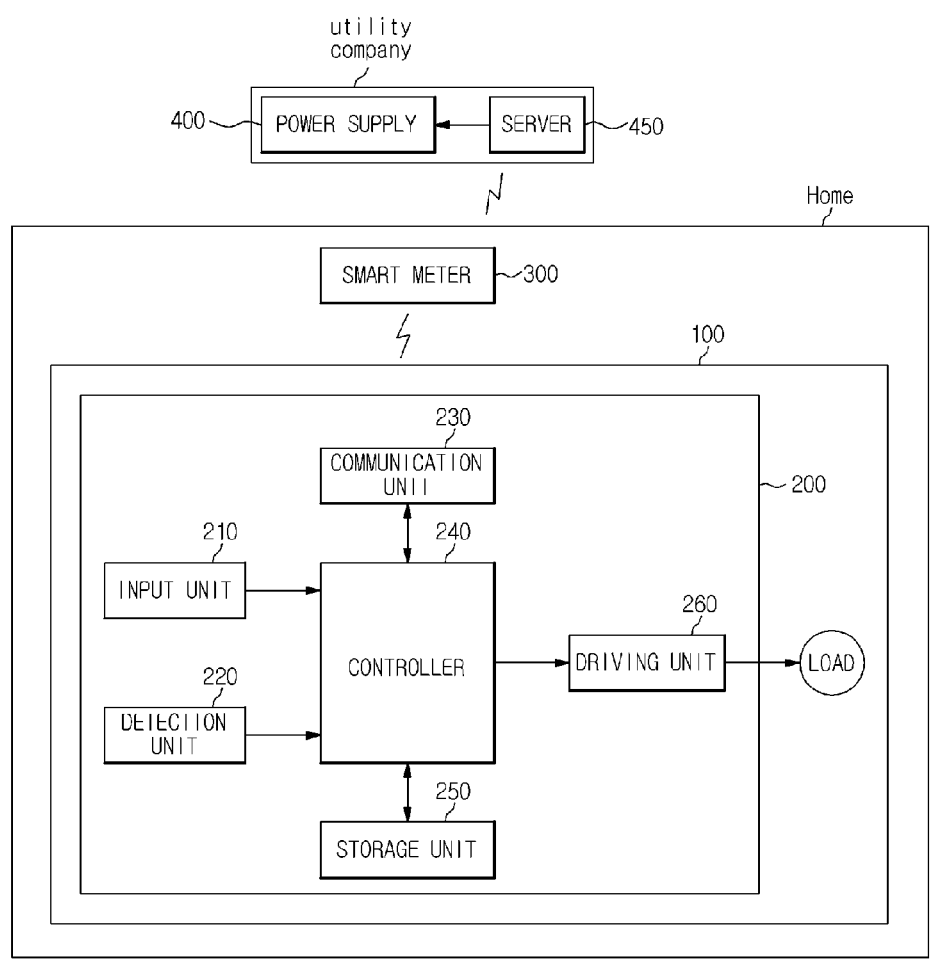
FIG. 3 is a view showing the construction of the refrigerator according to the embodiment of the present disclosure.
Figure 4:
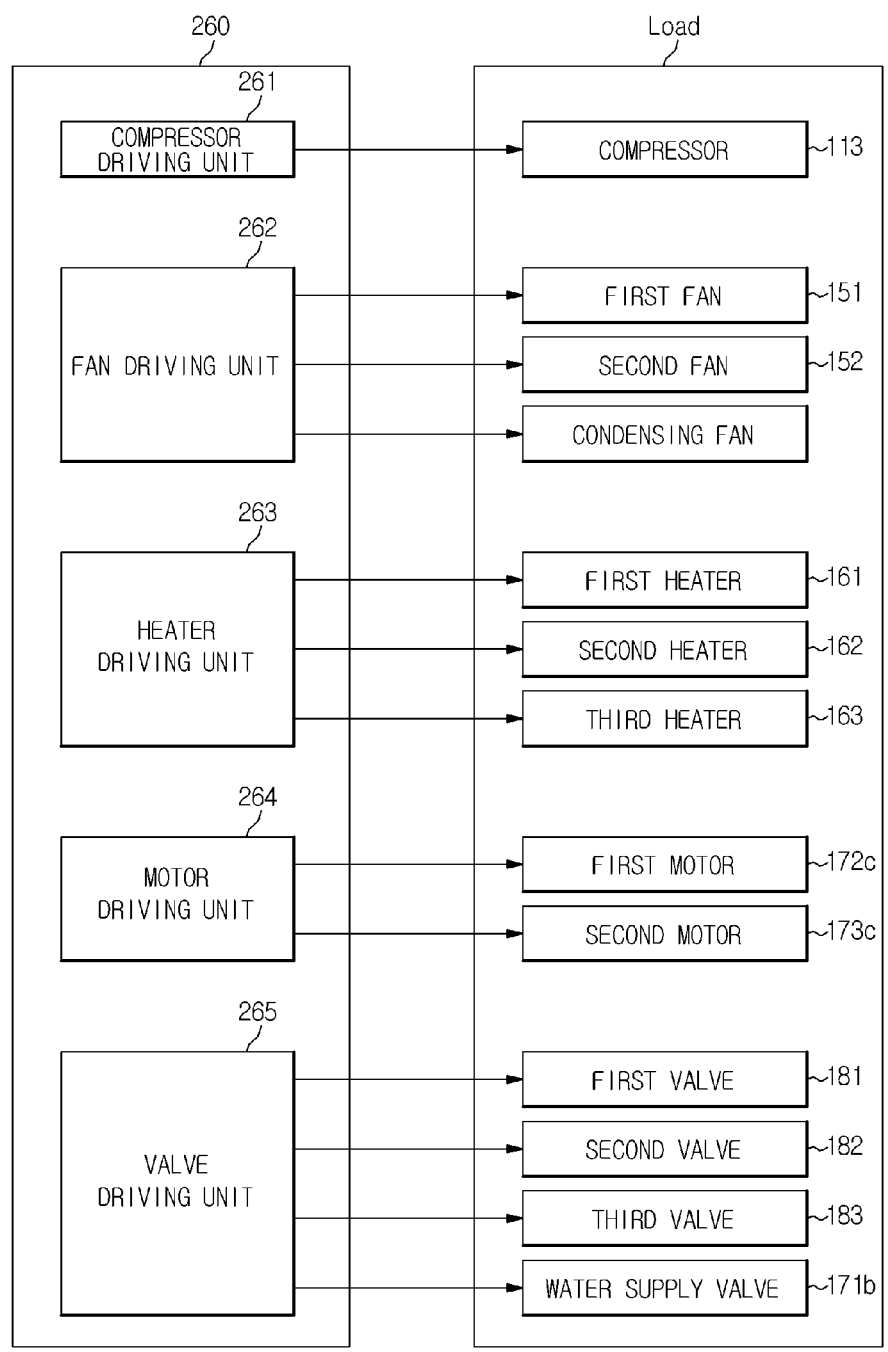
FIG. 4 is a view showing the detailed construction of the refrigerator according to the embodiment of the present disclosure.

FIG. 3 is a view showing the construction of the refrigerator according to the embodiment of the present disclosure, and FIG. 4 is a view showing the detailed construction of a driving unit in a control device provided in the refrigerator according to the embodiment of the present disclosure.

As shown in FIG. 3, the refrigerator 100 has a smart grid function to communicate with the outside and drive various loads based on a received signal.

The refrigerator includes a plurality of loads and a control device 200 to control driving of the loads.

The control device 200 includes an input unit 210, a detection unit 220, a communication unit 230, a controller 240, a storage unit 250, and a driving unit 260.

The input unit 210 allows a user to input first target temperature of the refrigerator compartment and second target temperature of the freezer compartment.

The detection unit 220 includes a first temperature detection unit to detect refrigerating temperature of the refrigerator compartment 121 and a second temperature detection unit to detect freezing temperature of the freezer compartment 122.

Also, the detection unit 220 includes a full-ice detection unit to detect the amount of ice stored in the container 173a of the storage unit 173. The full-ice detection unit detects an ON or OFF state depending upon the position of the full-ice lever. For example, when the amount of ice is small, the position of the full-ice lever is low with the result that an OFF signal is detected. When the container is full of ice, the position of the full-ice lever becomes high with the result that an ON signal is detected.

The communication unit 230 performs two-way communication with a smart meter 300 to receive a power-saving signal from the smart meter 300.

The power-saving signal, which is a signal transmitted from a utility company, includes a first power-saving mode execution request signal or a second power-saving mode execution request signal.

The communication unit 230 may directly communicate with the utility company via a network in a consumer home.

The controller 240 controls driving of the compressor 113, the first valve 181, and the first fan 151 so that the temperature of the refrigerator compartment is maintained at the first target temperature based on the refrigerating temperature detected by the first temperature detection unit when a general mode is executed. Also, the controller 240 controls driving of the compressor 113, the second valve 182, and the second fan 152 so that the temperature of the freezer compartment is maintained at the second target temperature based on the freezing temperature detected by the second temperature detection unit when the general mode is executed. At this time, the compressor has an operation rate of 100%.

Also, the controller 240 determines whether it is defrosting operation time of the first and second evaporators when the general mode is executed. Upon determining that it is the defrosting operation time of at least one of the first and second evaporators, the controller 240 controls driving of a corresponding heater to perform a defrosting operation. In addition, the controller 240 controls driving of the water supply valve 171a, the third heater 163, and the first and second motors 172c and 173c to perform an ice-making operation until a full-ice state is detected.

When the first power-saving mode execution request signal is received through the communication unit 230, the controller 240 controls driving of the loads to execute a first power-saving mode. When the second power-saving mode execution request signal is received through the communication unit 230, the controller 240 controls driving of the loads to execute a second power-saving mode. When the first and second power-saving mode execution request signals are not received, the controller 240 controls driving of the loads to execute the general mode.

The first power-saving mode and the second power-saving mode are set based on a concentration degree of power consumption. The concentration degree of the second power-saving mode is greater than that of the first power-saving mode, and therefore, it may be necessary to reduce power consumption by much more in the second power-saving mode.

The first power-saving mode execution request signal includes first execution time during which the first power-saving mode is executed. The second power-saving mode execution request signal includes second execution time during which the second power-saving mode is executed. The first power-saving mode includes a first power-saving level, second power-saving level, and third power-saving level divided based on a reduction amount of power.

That is, when the first, second, and third power-saving levels of the first power-saving mode are executed, the controller 240 raises the second target temperature of the freezer compartment by a predetermined temperature and resets the second target temperature, and controls driving of the compressor 113, the second valve 182, and the second fan 152 so that the temperature of the freezer compartment 122 is maintained at the reset second target temperature.

The controller 240 determines whether it is ice-making operation time when the second power-saving level of the first power-saving mode is executed. Upon determining that it is the ice-making operation time, the controller 240 lowers the operation rate of the compressor 113.

The controller 240 determines whether it is defrosting operation time or ice-making operation time when the third power-saving level of the first power-saving mode is executed. Upon determining that it is the defrosting operation time or the ice-making operation time, the controller 240 controls the defrosting operation or the ice-making operation to be delayed until the first execution time elapses.

For the second execution time when the second power-saving mode is executed, the controller 240 controls driving of the compressor 113 to be stopped so that a refrigeration cycle is not performed, controls driving of the first heater 161 and the second heater 162 to be stopped so that the defrosting operation is not performed, and controls driving of the water supply valve 171*b*, the first motor 172*c*, the second motor 173*c*, and the third heater 163 to be stopped so that the ice-making operation is not performed.

In addition, in a case in which time information of the first and second power-saving modes is notified from the utility company before predetermined time, the defrosting operation may be performed before the first and second power-saving modes are executed.

The controller 240 also controls driving of an anti-sweat heater and a French heater provided in the refrigerator to be stopped.

The first execution time is about 4 hours at maximum, and the second execution time is about 10 minutes at maximum, which does not affect lowering functionality of the refrigerator.

If the total power consumption amount in the consumer home exceeds allowable power consumption amount, the controller 240 may control the first power-saving mode or the second power-saving mode to be executed in response to the exceeded amount.

Consequently, the refrigerator may execute the second power-saving mode to restrict the average power consumption for 24 hours up to 50%.

The storage unit 250 stores operation information of loads corresponding to various power-saving levels of the first power-saving mode, operation information of loads corresponding to the second power-saving mode, and execution time of the first and second power-saving modes.

Also, the storage unit 250 may store allowable power of the consumer home.

The driving unit 260 drives various loads according to a command from the controller 240.

As shown in FIG. 4, the driving unit 260 includes a compressor driving unit 261, a fan driving unit 262, a heater driving unit 263, a motor driving unit 264, and a valve driving unit 265.

The compressor driving unit 261 drives the compressor 113 at an operation rate corresponding to the command of the controller 240. According to the command of the controller 240, the fan driving unit 262 drives the first fan 151 to circulate air in the refrigerator compartment, drives the second fan 152 to circulate air in the freezer compartment, and drives the condensing fan to cool the condenser.

According to the command of the controller 240, the heater driving unit 263 drives the first heater 161 at defrosting operation time of the first evaporator, drives the second heater 162 at defrosting operation time of the second evaporator, and drives the third heater 163 at defrosting operation time of the third evaporator or at ice-separating time.

Also, the heater driving unit 263 drives the anti-sweat heater provided between heat insulation members of the main body to prevent dew from being formed at the wall of the main body and the French heater mounted in a home bar to prevent dew from being formed at the home bar.

According to the command of the controller 240, the motor driving unit 264 drives the first motor 172*c* to separate ice and drives the second motor 173*c* to disperse and discharge the ice.

According to the command of the controller 240, the valve driving unit 265 opens the first valve 181 to supply the refrigerant to the first evaporator 141, opens the second valve 182 to supply the refrigerant to the second evaporator 142, opens the third valve 183 to supply the refrigerant to the third evaporator 143, and opens the water supply valve 171*b* to supply water to the ice-making unit.

The smart meter 300 performing two-way communication with the refrigerator 100 is configured as follows.

The smart meter 300 is an electronic wattmeter installed in a consumer home to display power consumption amount of the consumer home through a display, such as a liquid crystal display (LCD).

The smart meter 300 performs two-way communication with the utility company.

That is, the smart meter 300 receives first and second power-saving mode execution request signals from the utility company, displays the received first and second power-saving mode execution request signals for a user, and transmits the first power-saving mode execution request signal to the refrigerator 100.

Also, when power price and/or price level is received from the utility company, the smart meter 300 displays the received the power price and/or price level.

The refrigerator 100 may directly receive first and second power-saving mode execution request signals from the utility company.

The utility company to transmit the first and second power-saving mode execution request signals to the smart meter 300 or the refrigerator 100 is configured as follows.

The utility company includes a server 450. The server 450 is connected to smart meters 300 or refrigerators 100 provided in a plurality of consumer homes via a network to transmit and receive information for power consumption management. The network includes a wired network, a wireless network, and a wired and wireless composite network.

The utility company includes a power supply 400. The power supply 400 is driven by the utility company to produce and supply power. The power supply 400 produces power through nuclear power generation, water power generation, steam power generation, and wind power generation, and supplies the produced power to consumer homes in a management region.

The power supplied to the consumer homes in the management region is fixed, whereas power consumption of the consumer homes greatly differs according to time zone. For example, power consumption of the consumer homes at dawn or in the morning is less than that in the afternoon or in the evening. Also, power consumption of the consumer homes in spring and fall is less than that in summer or winter.

For this reason, the utility company sets power price for time during which total power consumption in the management region is low so as to be cheaper than power price for time during which power consumption is high, and sets power price for seasons during which power consumption is low so as to be cheaper than power price for seasons during which power consumption is high.

In this way, the utility company may flexibly differently set power price based on power consumption of consumer homes to maintain a balance between supply and demand of power.

The utility company estimates the amount of power that can be supplied (hereinafter, power supply amount) based on a power generation state of a power plant, estimates the amount of power to be consumed (hereinafter, power consumption amount) based on past power usage information in the management region by season/time and weather information, and sets power price based on a ratio of the power consumption amount to the power supply amount. At this time, the utility company may set a price level corresponding to the power price.

The utility company estimates the amount of power that can be supplied (hereinafter, power supply amount) based on the power generation state of the power plant, estimates the amount of power to be consumed (hereinafter, power consumption amount) based on past power usage information in the management region by season/time and weather information, and compares the power consumption amount with the power supply amount in the management region to estimate a time zone in which the power consumption amount is approximate to the power supply amount.

The power consumption amount being approximate to the power supply amount means that power consumption is concentrated at a specific time zone. Consequently, the time zone at which the power consumption is concentrated is notified to consumer homes so that the consumer homes may reduce power consumption in this time zone.

That is, for the consumer homes to reduce power consumption at the time zone at which the power consumption is concentrated, the utility company transmits a first power-saving mode execution request signal to the consumer homes if the difference between the power consumption amount and the power supply amount is within a first range, and transmits a second power-saving mode execution request signal to the consumer homes if the difference between the power consumption amount and the power supply amount is within a second range.

The value of the second range is more approximate to the power supply amount than that of the first range.

For the power supply amount, the minimum amount of power or average amount of power supplied to the management region may be preset as the reference amount of power.

Figure 5:
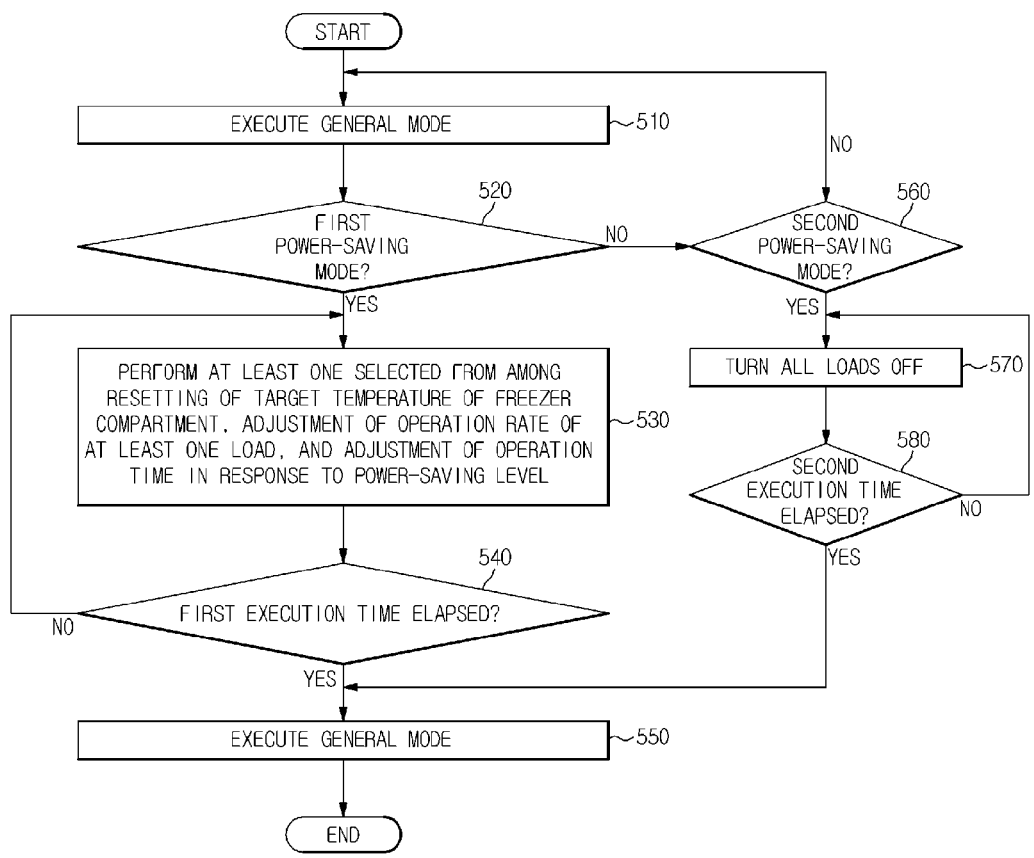
FIGS. 5 and 6 are control flow charts of the refrigerator according to the embodiment of the present disclosure.
Figure 6:
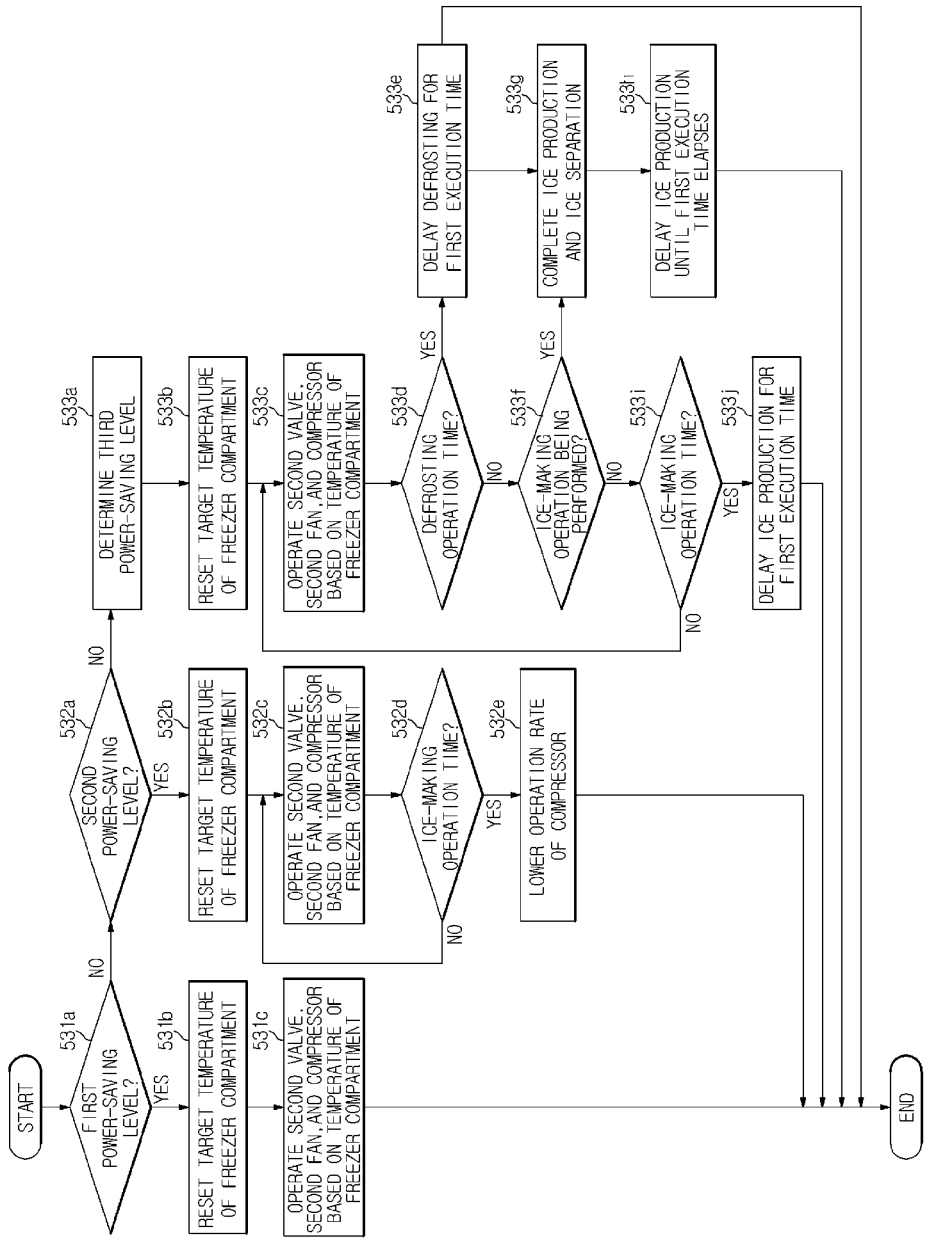

FIGS. 5 and 6 are control flow charts of the refrigerator according to the embodiment of the present disclosure.

When first and second power-saving mode execution request signals are not received from the smart meter 300, the refrigerator 100 executes a general mode (510).

When the general mode is executed, the refrigerator 100 controls driving of the compressor 113, the first valve 181, and the first fan 151 so that the temperature of the refrigerator compartment is maintained at first target temperature based on refrigerating temperature detected by the first temperature detection unit, and controls driving of the compressor 113, the second valve 182, and the second fan 152 so that the temperature of the freezer compartment is maintained at second target temperature based on freezing temperature detected by the second temperature detection unit.

When the general mode is executed, the refrigerator 100 operates the compressor at an operation rate of 100%.

During execution of the general mode, the refrigerator 100 determines whether it is defrosting operation time of the first and second evaporators 141 and 142. Upon determining that it is the defrosting operation time of the first evaporator, the refrigerator 100 controls driving of the first heater 161 so that a defrosting operation is performed. Upon determining that it is the defrosting operation time of the second evaporator, the refrigerator 100 controls driving of the second heater 162 so that the defrosting operation is performed.

During execution of the general mode, the refrigerator 100 controls driving of the water supply valve 171a, the third heater 163, and the first and second motors 172c and 173c so that an ice-making operation is performed. Upon detecting a full-ice state through the full-ice lever, the refrigerator 100 ends the ice-making operation.

In this way, the refrigerator confirms whether a first power-saving mode execution request signal or a second power-saving mode execution request signal is received through the communication unit 230 while performing a general operation.

When a power-saving mode execution request signal is received through the communication unit 230, the refrigerator determines whether the requested power-saving mode is a first power-saving mode or a second power-saving mode.

Upon determining that the requested power-saving mode is the first power-saving mode (520), the refrigerator performs at least one selected from among resetting of the second target temperature of the freezer compartment, adjustment of the operation rate of the compressor, adjustment of the defrosting operation time, and adjustment of the ice-making operation in response to a power-saving level (530). When the first execution time of the first power-saving mode elapses (540), the refrigerator executes the general mode (550).

The first power-saving mode includes a first power-saving level, second power-saving level, and third power-saving level based on the power saving amount. Adjusting the operation of at least one load at each power-saving level will hereinafter be described with reference to FIG. 6.

Upon determining that the power-saving level of the first power-saving mode is the first power-saving level (531a), the refrigerator raises the second target temperature of the freezer compartment 122 by a predetermined temperature and resets the second target temperature (531b), and controls driving of the compressor 113, the second valve 182, and the second fan 152 so that the temperature of the freezer compartment is maintained at the reset second target temperature (531c). The predetermined temperature is about 2° C.

Upon determining that the power-saving level of the first power-saving mode is the second power-saving level (532a), the refrigerator raises the second target temperature of the freezer compartment 122 by a predetermined temperature and resets the second target temperature (532b), controls driving of the compressor 113, the second valve 182, and the second fan 152 so that the temperature of the freezer compartment is maintained at the reset second target temperature (532c), and determines whether it is defrosting operation time (532d).

Upon determining that it is the defrosting operation time during execution of the second power-saving level of the first power-saving mode, the refrigerator lowers the operation rate of the compressor 113 (532e) to reduce power consumed to make ice.

Upon determining that the power-saving level of the first power-saving mode is the third power-saving level (533a), the refrigerator raises the second target temperature of the freezer compartment 122 by a predetermined temperature and resets the second target temperature (533b), controls driving of the compressor 113, the second valve 182, and the second fan 152 so that the temperature of the freezer compartment is maintained at the reset second target temperature (533c), and determines whether it is ice-making operation time, defrosting operation time, or an ice-making operation is being performed.

Upon determining that it is the defrosting operation time during execution of the third power-saving level of the first power-saving mode (533d), the refrigerator delays the defrosting operation until the first execution time elapses (533e). That is, the refrigerator stops driving of the first and second heaters so that the defrosting operation is not performed.

Upon determining that the ice-making operation is being performed during execution of the third power-saving level of the first power-saving mode (533f), the refrigerator completes ice production and performs ice separation. Upon completing ice separation (533g), the refrigerator delays the next ice-making operation until the first execution time elapses (533h). At this time, the refrigerator supplies cool air into the ice-making compartment to prevent ice in the storage unit from melting. That is, the refrigerator performs the same operation as in a full-ice state. Also, the refrigerator stops driving of the water supply valve, the third heater, and the third valve so that the next ice-making operation is not performed. During delay of the next ice-making operation, the refrigerator converts the state of the ice-making compartment into a full-ice state so that cool air from the freezer compartment is continuously supplied to the ice-making compartment to prevent ice in the ice-making compartment from melting.

Upon determining that it is the ice-making operation time (533i), the refrigerator delays the ice-making operation for the first execution time (533j) to reduce power consumed to remove frost and to make ice. That is, the refrigerator stops driving of the water supply valve, the third heater, and the third valve.

During delay of the ice-making operation, the refrigerator converts the state of the ice-making compartment into a full-ice state so that cool air from the freezer compartment is continuously supplied to the ice-making compartment to prevent ice in the ice-making compartment from melting.

Upon determining that the requested power-saving mode is the second power-saving mode (560), the refrigerator stops driving of the compressor 113 for the second execution time, stops driving of the first and second heaters 161 and 162 so that the defrosting operation is not performed, and stops driving of the water supply valve 171b, the first and second motors 172c and 173c, and the third heater 163 so that the ice-making operation is not performed.

Also, the refrigerator stops driving of the anti-sweat heater and the French heater provided in the refrigerator.

In this way, the refrigerator may turn off at least one of the loads at the time zone at which power consumption is concentrated, thereby reducing power consumption and electric charges. Furthermore, the refrigerator may disperse power consumption at the time zone at which the power consumption is concentrated and may reduce peak power, thereby constructing a smart grid and contributing to overall power saving.

Also, the power-saving mode may be divided into a plurality of power-saving levels based on the concentration degree of power consumption in the management region, and the refrigerator may adjust the operation rate or operation time of at least one load in response to each power-saving level, thereby reducing power consumption. Also, lowering the functionality of the refrigerator may be minimized while power consumption is reduced, thereby improving user satisfaction.

The first and second power saving of the refrigerator may be controlled by an energy management system (EMS), which will hereinafter be described in brief as another embodiment.

Figure 7:
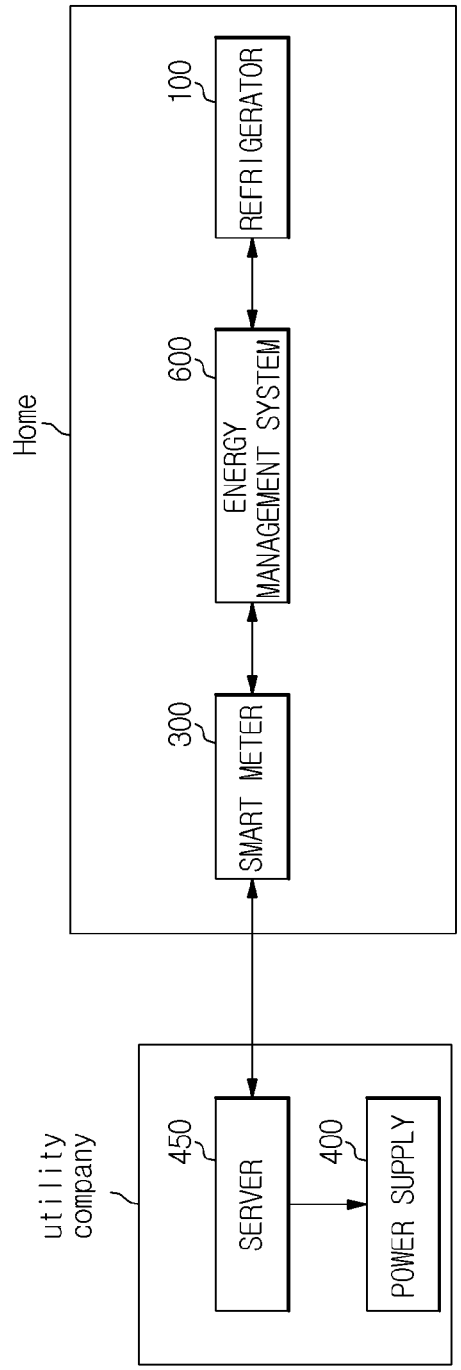
FIG. 7 is a view showing the construction of a refrigerator according to another embodiment of the present disclosure.

FIG. 7 is a view showing the construction of a refrigerator according to another embodiment of the present disclosure. The refrigerator performs communication with an energy management system 600.

A utility company and a power supply 400 of this embodiment are identical to those of the previous embodiment, and therefore, a description thereof will be omitted.

A smart meter 300 performs two-way communication with the utility company and the power supply 400 to receive first and second power-saving mode execution request signals from the utility company, to display the received first and second power-saving mode execution request signals for a user, and to transmit the first power-saving mode execution request signal to the energy management system 600.

The energy management system 600 is also referred to as a demand response (DR) controller. The energy management system 600 performs communication with the smart meter 300. Upon receiving first and second power-saving mode execution request signals from the smart meter 300, the energy management system 600 transmits load control signals corresponding to first and second power-saving modes to the refrigerator 100.

Upon receiving a first power-saving mode signal, the energy management system 600 transmits a command to reset second target temperature of the freezer compartment to the refrigerator 100 so that the temperature of the freezer compartment 122 is maintained at the reset second target temperature.

During execution of a second power-saving level of the first power-saving mode, the energy management system 600 determines whether it is ice-making operation time. Upon determining that it is the ice-making operation time, the energy management system 600 transmits a signal to lower an operation rate of the compressor 113 to the refrigerator.

During execution of a third power-saving level of the first power-saving mode, the energy management system 600 determines whether it is defrosting operation time or ice-making operation time. Upon determining that it is the defrosting operation time or the ice-making operation time, the energy management system 600 transmits a defrosting operation or ice-making operation delay signal to the refrigerator until first execution time, during which the first power-saving mode is executed, elapses.

During execution of the first power-saving mode, the energy management system 600 transmits a driving off signal to the refrigerator.

The energy management system 600 may directly receive the first and second power-saving mode execution request signals from the utility company.

The energy management system 600 may compare estimated power amount by time of a consumer home with predetermined allowable power amount to determine a time zone in which the estimated power amount exceeds the allowable power amount, and may control the refrigerator 100 in one of the first and second power-saving modes at the determined time zone. At this time, the first power-saving mode or the second power-saving mode may be selected depending upon the exceeded power amount.

As is apparent from the above description, according to an aspect of the present disclosure, the refrigerator may turn off at least one of the loads at the time zone at which power consumption is concentrated, thereby reducing power consumption and electric charges.

In this way, the refrigerator may disperse power consumption at the time zone at which the power consumption is concentrated and may reduce peak power, thereby constructing a smart grid and contributing to overall power saving.

Also, the power-saving mode may be divided into a plurality of power-saving levels based on the concentration degree of power consumption in the management region, and the refrigerator may adjust the operation rate or operation time of at least one load in response to each power-saving level, thereby reducing power consumption.

Also, lowering of the functionality of the refrigerator may be minimized while power consumption is reduced, thereby improving user satisfaction.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A refrigerator comprising:
   an evaporator to cool a storage compartment;
   a compressor to supply a refrigerant to the evaporator;
   a valve to adjust flow of the refrigerant supplied from the compressor to the evaporator;
   a fan to blow air heat-exchanged by the evaporator;
   a heater to remove frost from the evaporator; and
   a control device to perform communication with a server of utility company and to control an operation of at least one selected from among the compressor, the valve, the fan, and the heater so that a power-saving mode is executed upon receiving a power-saving signal from the server,
   wherein the power-saving signal comprises a first power-saving mode based on a concentration degree of power consumption, the first power-saving mode comprising a first power-saving level and a second power-saving level divided based on a reduction amount of power,
   when the power-saving signal is the first power-saving level of the first power-saving mode, the control device controls an operation of at least one selected from among the compressor, the valve, the fan, and the heater for a first execution time so that a temperature of the storage compartment rises, and
   when the power-saving signal is the second power-saving level of the first power-saving mode, the control device controls the same operation as the operation performed in the first power-saving level, determines whether it is an ice-making operation time and, upon determining that it is the ice-making operation time, lowers an operation rate of the compressor, as compared with the operation rate of the compressor prior to receiving the power-saving signal in sequence.

2. The refrigerator according to claim 1, wherein the power-saving signal further comprises a second power-saving mode based on the concentration degree of power consumption.

3. The refrigerator according to claim 1, wherein the first power-saving mode further comprises a third power-saving level, and
   when the power-saving signal is the third power-saving level of the first power-saving mode, the control device determines whether it is ice-making operation time and, upon determining that it is the ice-making operation time, delays an ice-making operation for the first execution time.

4. The refrigerator according to claim 1, wherein, when the power-saving signal is the first power-saving mode, the control device raises target temperature of the storage compartment by a predetermined temperature and resets the target temperature, and controls the operation of the compressor, the valve, and the fan so that the temperature of the storage compartment is maintained at the reset target temperature.

5. The refrigerator according to claim 2, wherein, when the power-saving signal is the second power-saving mode, the control device controls the compressor, the valve, the fan, and the heater to be off for second execution time.

6. The refrigerator according to claim 3, wherein, when the power-saving signal is the third power-saving level of the first power-saving mode, the control device determines whether it is defrosting operation time and, upon determining that it is the defrosting operation time, controls the heater to be off for first execution time.

7. The refrigerator according to claim 3, further comprising:
   an ice-making compartment;
   a tray provided in the ice-making compartment to make ice;
   a water supply valve to adjust supply of water to the tray;
   an ice-making evaporator to cool the tray;
   an ice-making valve to adjust flow of a refrigerant supplied to the ice-making evaporator; and
   an ice-separating heater to separate the ice from the tray.

8. The refrigerator according to claim 7, wherein the control device upon the determining that it is the ice-making operation time, controls the water supply valve, the ice-separating heater and the ice-making valve to be off for the first execution time to delay the ice-making operation.

9. The refrigerator according to claim 7, wherein, when the power-saving signal is the third power-saving level of the first power-saving mode, the control device determines whether the ice-making operation is being performed and, upon determining that the ice-making operation is being performed, completes the ice-making operation and ice separation, and upon determining that it is a next ice-making operation time, controls the water supply valve, the ice-separating heater and the ice-making valve to be off until first execution time elapses to delay the next ice-making operation.

10. The refrigerator according to claim 1, wherein the storage compartment comprises a freezer compartment to store food in a frozen state.

11. The refrigerator according to claim 10, further comprising:
- a refrigerator compartment to store food in a refrigerated state;
- a refrigerating evaporator to cool the refrigerator compartment; and
- a defrosting heater of the refrigerating evaporator to remove frost from the refrigerating evaporator, wherein
- upon receiving the power-saving signal from the utility company, the control device determines whether it is defrosting operation time of the refrigerating evaporator and, upon determining that it is the defrosting operation time of the refrigerating evaporator, controls an operation of the defrosting heater of the refrigerating evaporator to execute the power-saving mode.

* * * * *